United States Patent
Corn et al.

(10) Patent No.: US 12,502,809 B2
(45) Date of Patent: Dec. 23, 2025

(54) POLYMER INJECTION SYSTEM COMPRISING MULTIPLE PUMPS AND METHODS OF USING SAME

(71) Applicant: Shaw Industries Group, Inc., Dalton, GA (US)

(72) Inventors: Joel Corn, Dalton, GA (US); Richard Rapp, Dalton, GA (US)

(73) Assignee: Shaw Industries Group, Inc., Dalton, GA (US)

( * ) Notice: Subject to any disclaimer, the term of this patent is extended or adjusted under 35 U.S.C. 154(b) by 117 days.

(21) Appl. No.: 18/145,881

(22) Filed: Dec. 23, 2022

(65) Prior Publication Data

US 2023/0202073 A1    Jun. 29, 2023

Related U.S. Application Data

(60) Provisional application No. 63/293,190, filed on Dec. 23, 2021.

(51) Int. Cl.
*B29C 31/04* (2006.01)

(52) U.S. Cl.
CPC .................................. *B29C 31/04* (2013.01)

(58) Field of Classification Search
None
See application file for complete search history.

(56) References Cited

U.S. PATENT DOCUMENTS

| | | | |
|---|---|---|---|
| 3,930,782 A | 1/1976 | Bigland | |
| 4,663,096 A | 5/1987 | Uenoyama et al. | |
| 6,306,323 B1 | 10/2001 | Chu et al. | |
| 7,504,056 B2 | 3/2009 | Kobayashi | |
| 9,333,674 B2 | 5/2016 | Asagiri et al. | |
| 11,473,216 B2 | 10/2022 | Clark | |
| 11,473,315 B2 | 10/2022 | D'hondt et al. | |
| 2008/0197519 A1 | 8/2008 | Bacher et al. | |

FOREIGN PATENT DOCUMENTS

WO    2007121696    11/2007

OTHER PUBLICATIONS

Manfred WO2007121696 A1 English Translation 2007 (Year: 2007).*
International Search Authority Search Report and Written Opinion for PCT/US 22/53929.

* cited by examiner

*Primary Examiner* — Jacob T Minskey
*Assistant Examiner* — Adrien J Bernard
(74) *Attorney, Agent, or Firm* — Ballard Spahr LLP

(57) ABSTRACT

An injection system for injecting additive into a polymer transfer line is disclosed. The injection system can include an extruder having an inlet and an outlet. The injection system can further include a melt pump subsystem comprising at least a first melt pump and a second melt pump. Each melt pump of the first and second melt pumps can have an inlet and an outlet. The inlet of each of the first and second melt pumps can be in fluid communication with the outlet of the extruder. The first and second melt pumps can be arranged in parallel so that flow from the outlet of the extruder divides between the first melt pump and the second melt pump. The outlet of each of the first and second melt pumps can be in fluid communication with a polymer transfer line.

20 Claims, 6 Drawing Sheets

POLYMER INJECTION SYSTEM COMPRISING MULTIPLE PUMPS AND METHODS OF USING SAME

CROSS-REFERENCE TO RELATED APPLICATION

This application claims the benefit of the filing date of U.S. Provisional Patent Application No. 63/293,190, filed Dec. 23, 2021, the entirety of which is hereby incorporated by reference herein in its entirety.

FIELD

This disclosure is directed to pumping systems for delivering additives into a polymer transfer line.

BACKGROUND

Conventional pump systems have low accuracy when operating below their maximum flow rate. Thus, in order to include a pump with a sufficient capacity to deliver a necessary flow for a relatively high flow rate, accuracy is sacrificed for pumping at relatively low flow rates.

One or more additives, such as a colored polymer melt concentrate, can be injected by a pump system into a polymer transfer line for mixing with a primary polymer melt. The mixed polymer melt in the polymer transfer line is then transferred to a product forming device for forming a polymer product. Controlling the rate of injection of the one or more additives into the polymer transfer line is critical in order to produce products with a desired concentration of the one or more additives. Different polymer products require different concentrations of the one or more additives. Thus, the pump system injecting the one or more additives into the polymer line should be designed to accurately provide for a predetermined rate of injection. Conventional pump systems do not provide an accurate rate of injection when operated below their maximum capacity. Thus, it is desired to provide for a pump system that provides for an accurate rate of injection regardless if the system is operated at maximum or below maximum capacity.

Disclosed herein are systems and methods that provide for an accurate rate of injection regardless if the system is operated at maximum or below maximum capacity.

SUMMARY

Disclosed herein is a system comprising an extruder having an outlet. The system can further comprise a melt pump subsystem comprising at least a first melt pump and a second melt pump. Each melt pump of the first and second melt pumps can have an inlet and an outlet. The inlet of each of the first and second melt pumps can be in fluid communication with the outlet of the extruder. The first and second melt pumps can be arranged in parallel so that flow from the outlet of the extruder divides between the first melt pump and the second melt pump. The outlet of each of the first and second melt pumps can be in fluid communication with a polymer transfer line.

Also disclosed herein is a method comprising dividing flow from a flow source between a first pump and a second pump. The first and second pumps can pump the flow into a transfer line.

Additional advantages of the disclosed system and method will be set forth in part in the description which follows, and in part will be understood from the description, or may be learned by practice of the disclosed system and method. The advantages of the disclosed system and method will be realized and attained by means of the elements and combinations particularly pointed out in the appended claims. It is to be understood that both the foregoing general description and the following detailed description are exemplary and explanatory only and are not restrictive of the invention as claimed.

DETAILED DESCRIPTION

Figure 1:
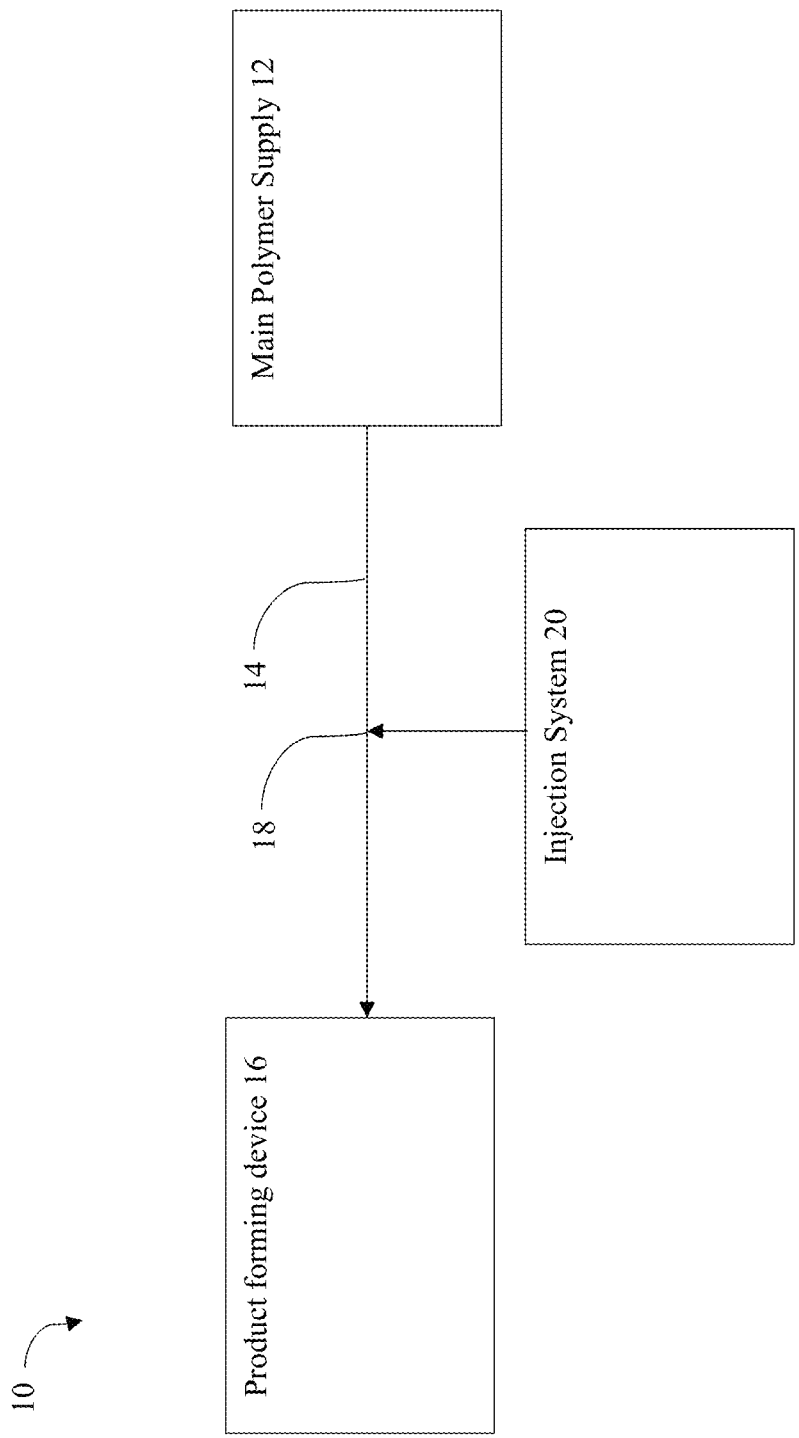
FIG. 1 is a schematic diagram of a system for forming polymer product as disclosed herein.

The disclosed system and method may be understood more readily by reference to the following detailed description of particular embodiments and the examples included therein and to the Figures and their previous and following description.

It is to be understood that the terminology used herein is for the purpose of describing particular embodiments only and is not intended to limit the scope of the present disclosure which will be limited only by the appended claims.

It must be noted that as used herein and in the appended claims, the singular forms "a," "an," and "the" include plural references unless the context clearly dictates otherwise. Thus, for example, reference to "a melt pump" includes one or more of such melt pumps, and so forth.

"Optional" or "optionally" means that the subsequently described event, circumstance, or material may or may not occur or be present, and that the description includes instances where the event, circumstance, or material occurs or is present and instances where it does not occur or is not present.

Ranges may be expressed herein as from "about" one particular value, and/or to "about" another particular value. When such a range is expressed, also specifically contemplated and considered disclosed is the range from the one particular value and/or to the other particular value unless the context specifically indicates otherwise. Similarly, when values are expressed as approximations by use of the antecedent "about," it will be understood that the particular value forms another, specifically contemplated embodiment that should be considered disclosed unless the context specifically indicates otherwise. It will be further understood that the endpoints of each of the ranges are significant both in relation to the other endpoint, and independently of the other endpoint unless the context specifically indicates otherwise. Finally, it should be understood that all of the individual values and sub-ranges of values contained within an explicitly disclosed range are also specifically contemplated and should be considered disclosed unless the context specifically indicates otherwise. The foregoing applies regardless of whether in particular cases some or all of these embodiments are explicitly disclosed.

Optionally, in some aspects, when values are approximated by use of the antecedents "about," "substantially," or "generally," it is contemplated that values within up to 15%, up to 10%, up to 5%, or up to 1% (above or below) of the particularly stated value or characteristic can be included within the scope of those aspects.

Unless defined otherwise, all technical and scientific terms used herein have the same meanings as commonly understood by one of skill in the art to which the disclosed apparatus, system, and method belong. Although any apparatus, systems, and methods and materials similar or equivalent to those described herein can be used in the practice or testing of the present apparatus, system, and method, the particularly useful methods, devices, systems, and materials are as described.

Throughout the description and claims of this specification, the word "comprise" and variations of the word, such as "comprising" and "comprises," means "including but not limited to," and is not intended to exclude, for example, other additives, components, integers or steps. In particular, in methods stated as comprising one or more steps or operations it is specifically contemplated that each step comprises what is listed (unless that step includes a limiting term such as "consisting of"), meaning that each step is not intended to exclude, for example, other additives, components, integers or steps that are not listed in the step.

It is to be understood that unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is in no way intended that an order be inferred, in any respect. This holds for any possible non-express basis for interpretation, including: matters of logic with respect to arrangement of steps or operational flow; plain meaning derived from grammatical organization or punctuation; and the number or type of aspects described in the specification. Thus, words denoting order, such as "first" or "next," should be interpreted as optional aspects unless plain meaning or logic dictates otherwise.

As used herein, the term "polymer," such as used in "polymer flow" or "main polymer supply" or "polymer product," can comprise any suitable polymer such as, for example, a polyamide, a polyester, polylactic acid, polyurethane, polyvinyl chloride, polyolefin, acrylonitrile butadiene styrene, polystyrene, biopolymers, or a combination thereof.

The term "polyamide," as utilized herein, is defined to be any long-chain polymer in which the linking functional groups are amide (—CO—NH—) linkages. The term polyamide is further defined to include copolymers, terpolymers and the like as well as homopolymers and also includes blends of two or more polyamides. In one example, the polyamide can comprise one or more of nylon 6, nylon 66, nylon 10, nylon 612, nylon 12, nylon 11, or any combination thereof. In another example, the polyamide can comprise nylon 6 or nylon 66. In yet another example, the polyamide is nylon 6. In a yet further example, the polyamide is nylon 66.

As defined herein, the term "polyolefin" refers to any class of polymers produced from a simple olefin (also called an alkene with the general formula $C_nH_{2n}$) as a monomer. The polyolefin can comprise, for example, polyethylene, polypropylene, both homopolymer and/or copolymers, poly (1-butene), poly(3-methyl-1-butene), or poly(4-methyl-1-pentene) and the like, as well as combinations or mixtures of two or more of the foregoing. In one example, the polyolefin can comprise polyethylene or polypropylene. In another example, the polyolefin can comprise polyethylene. In yet another example, the polyolefin can comprise polypropylene.

As used herein, the term "polyester" refers to a category of polymers that contain the ester functional group in their main chain. Polyesters disclosed herein include naturally occurring chemicals, such as in the cutting of plant cuticles, as well as synthetics produced through step-growth polymerization. An non-limiting example of polyesters includes any long-chain synthetic polymer composed of at least 85% by weight of an ester of a substituted aromatic dicarboxylic acid, including but not restricted to substituted terephthalic units, $p(—R—O—CO—C_6H_4—CO—O—)_x$ and parasubstituted hydroxy-benzoate units, $p(—R—O—CO—C_6H_4—O)_x$. In certain examples, the polyesters comprise polyethylene terephthalate (PET) homopolymer and copolymers, polypropylene terephthalate (PPT) homopolymer and copolymers and polybutylene terephthalate (PBT) homopolymer and copolymers, and the like, including those that contain comonomers such as cyclohexanedimethanol, cyclohexanedicarboxylic acid, isophthalic acid, and the like.

As defined herein, the term "polyurethane" refers to any class of polymers composed of a chain of organic units joined by carbamate (urethane, $R_1—O—CO—NR_2-R_3$, wherein $R_1$, $R_2$, and $R_3$ are the same or different) links.

As defined herein, the term "polystyrene" refers to any class of synthetic polymers produced from a simple styrene as a monomer. It is understood that the term "polystyrene" includes isotactic, atactic, and syndiotactic polystyrenes. In some specific aspects, described are also co-polystyrenes including a high-impact polystyrenes (HIPS), acrylonitrile butadiene styrene (ABS) or copolymer of styrene with acrylonitrile (SAN), or copolymer of styrene with maleic acid (SMA).

Exemplary System

Disclosed herein and with reference to FIG. 1 is a system 10 for forming a product, such as a polymer product. The system 10 can comprise a main polymer supply 12 that can flow a primary polymer melt through a transfer line 14 to a product forming device 16. In exemplary aspects, the main polymer supply 12 can comprise one or more main extruders that can receive polymer feedstock composition from dryers or other material storage bins. The main extruders can serve as the primary melt source that can provide a primary polymer melt. Further embodiments of main polymer supplies are contemplated, including, but not limited to, a melting pin or a polymerization reactor. Optionally, the product forming device 16 can be a spinneret for forming fiber. Optionally, the product forming device 16 can be one of an injection mold, a blow mold, a pelletizer, a film die, a pipe die, a profile die, a thermoforming die, or an extruder. Although not shown, it is contemplated that the system 10 can comprise a plurality of product forming devices and the transfer line 14 can divide between the plurality of product forming devices. For example, in some aspects, the system 10 can comprise a plurality of spinnerets. The spinnerets can form bulk continuous filament (BCF). In exemplary aspects, the bulk continuous filament can comprise PET. Accordingly, the system 10 can be configured to form BCF yarn. As further disclosed herein, the BCF yarn can be colored yarn.

Figure 4:
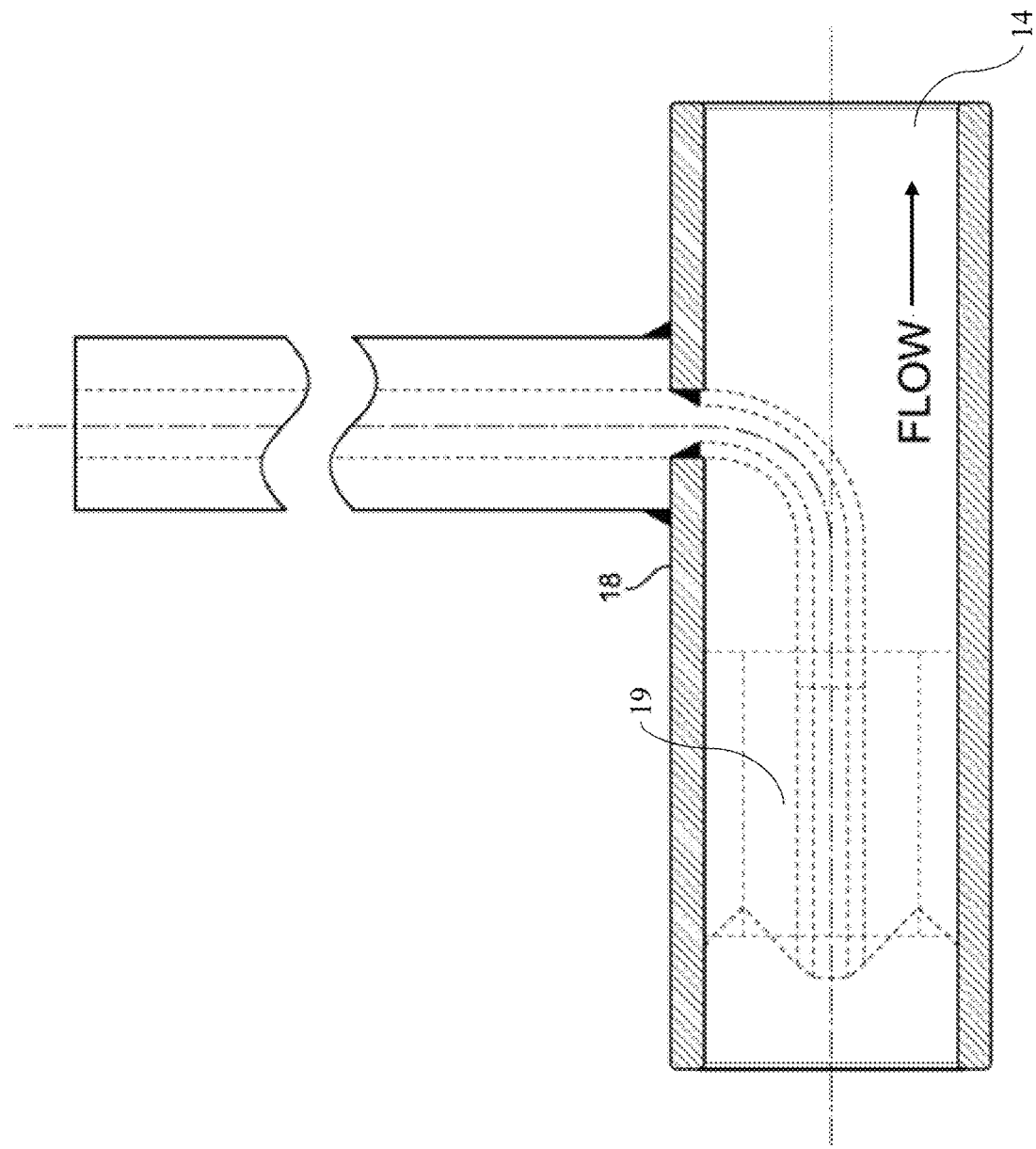
FIG. 4 is a schematic diagram of an exemplary mixing union (injector) of the system of FIG. 1.

An injection system 20 can be configured to inject one or more additives into the transfer line 14 at a mixing union 18. Referring also to FIG. 4, in some aspects, the mixing union can comprise a static mixer 19. Optionally, the one or more additives can comprise a colorant (e.g., an additive that, when mixed with polymer, at least partially controls a color of the polymer), such as a colored polymer melt concentrate. When added to the primary polymer melt, the colored polymer melt concentrate can mix with the primary polymer melt to form a product having a desired color. Thus, optionally, the primary polymer melt can be uncolored. In further aspects, the one or more additives can comprise a deep dye additive, a light dye additive, $TiO_2$, a UV stabilizer, a processing aid, a nucleator, or a process stabilizer, or a combination thereof. Optionally, the one or more additives can be constituents of a mixture, such as the one or more additives mixed with a polymer.

In some optional aspects, the colored polymer melt concentrate can enter the transfer line 14 in a direction that is opposite a flow direction of the transfer line 14. Injecting the colored polymer melt concentrate in contra-flow to the flow direction of the primary polymer melt (counter-current) can cause the molten color to be split up into a plurality of streams that then reverse flow to pass through the mixing union 18 in the flow direction. Optionally, one or more static mixers or other mixers can be provided downstream of the mixing union 18 (FIG. 4).

In further aspects, the colored polymer melt concentrate can enter the transfer line 14 co-current to the flow or perpendicular to or at any other angle relative to the direction of the flow through the transfer line 14, and one or more mixers (e.g., a static mixer) downstream can mix the colored polymer melt concentrate with the polymer melt from the main extruder. In yet further aspects, the colored polymer melt concentrate can enter the transfer line 14 both co-current and counter-current to the primary polymer melt flow direction.

Figure 2:
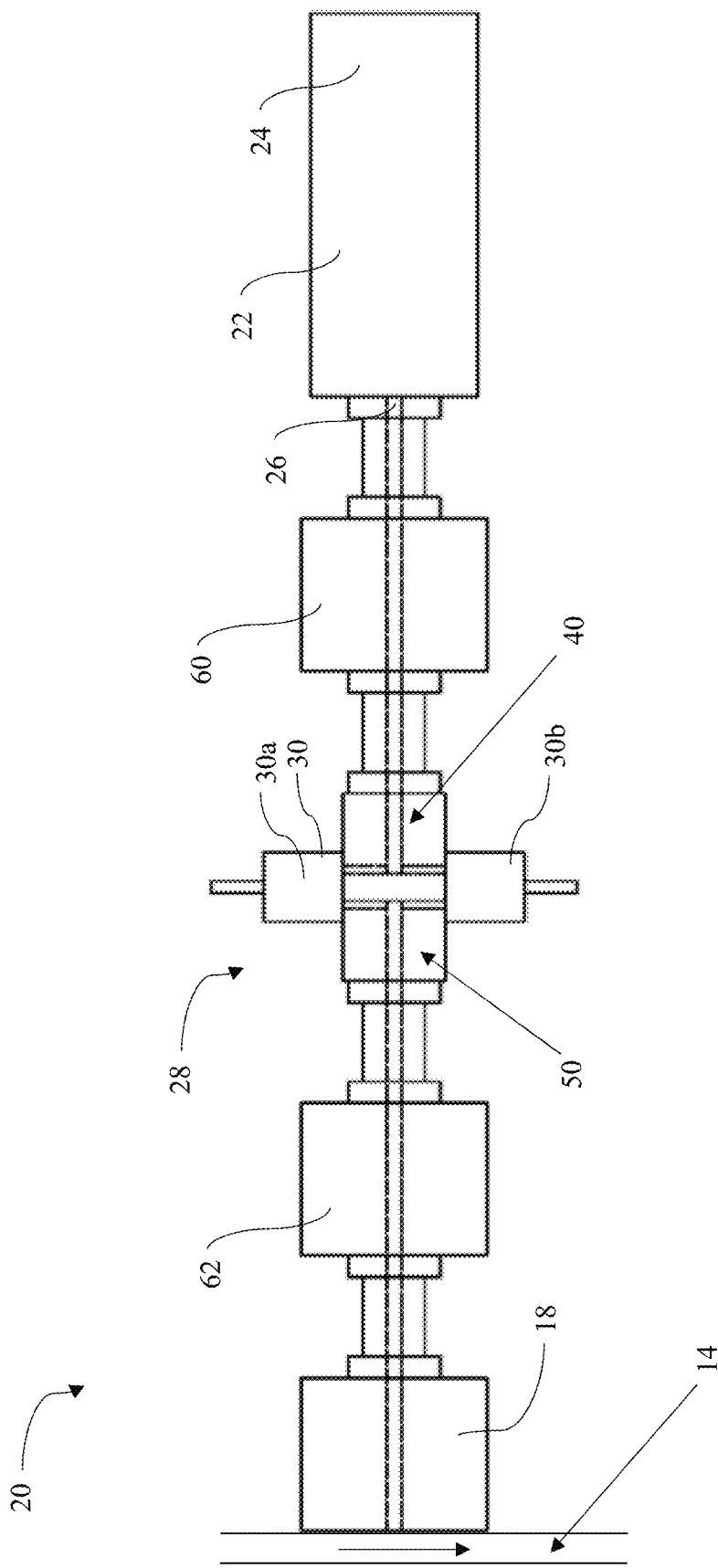
FIG. 2 is a schematic top view of an exemplary pump system of the system for forming polymer product as in FIG. 1.
Figure 3:
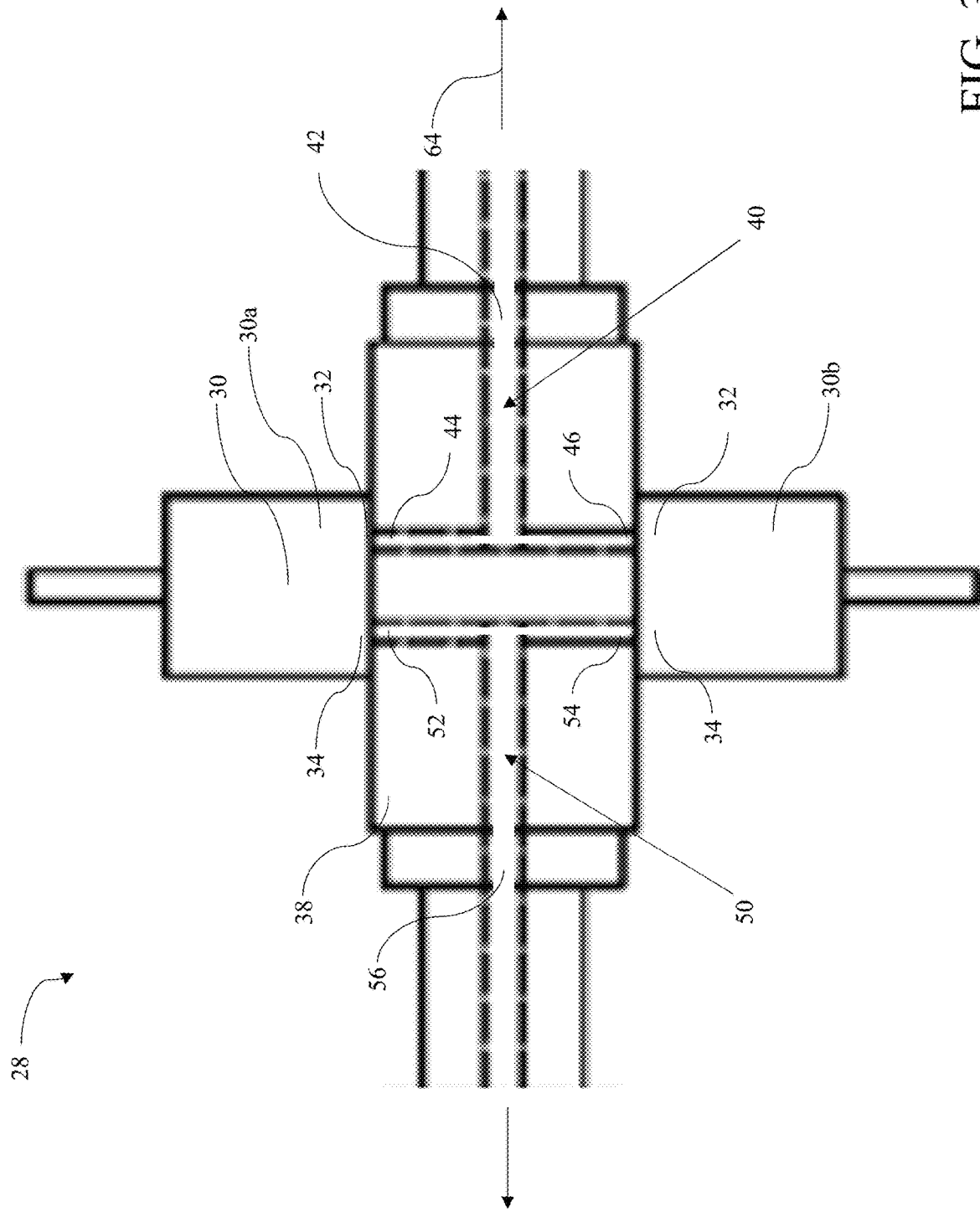
FIG. 3 is an enlarged portion of the exemplary pump system of FIG. 2.

Referring to FIGS. 2-3, the injection system 20 can comprise an extruder 22 having an inlet 24 and an outlet 26. The injection system 20 can further comprise a melt pump subsystem 28 comprising a plurality of melt pumps 30, the plurality of melt pumps comprising at least a first melt pump 30a and a second melt pump 30b. Each melt pump 30 can have an inlet 32 and an outlet 34. The inlet 32 of each melt pump 30 can be in fluid communication with the outlet 26 of the extruder 22. The first and second melt pumps 30a,b can be arranged in parallel so that flow from the outlet 26 of the extruder 22 divides between the first melt pump 30a and the second melt pump 30b. The outlet 34 of each of the first and second melt pumps 30a,b can be in fluid communication with the polymer transfer line 14.

The melt pump subsystem 28 can comprise a divider flow path 40 having an inlet 42, a first split outlet 44, and a second split outlet 46. The divider flow path 40 can be configured to divide flow from the inlet 42 between the first split outlet 44 and the second split outlet 46. The first split outlet 44 can be in communication with the first melt pump 30a, and the second split outlet 46 can be in communication with the second melt pump 30b.

Optionally, the melt pump subsystem 28 can comprise a converger flow path 50 having a first split inlet 52, a second split inlet 54, and an outlet 56. The converger flow path 50 can be configured to combine flow from the first and second split inlets 52, 54 and deliver combined flow from the first and second split inlets to the outlet 56 of the converger flow path 50. The outlet 56 of the converger flow path 50 can be in fluid communication with the polymer transfer line 14. It is further contemplated that flow from the outlets 34 of the first and second pumps 30a,b need not be combined and can be separately injected into the polymer transfer line 14.

Optionally, the melt pump subsystem 28 can comprise a manifold 38 that defines the divider flow path 40 and the converger flow path 50. The manifold 38 can be, for example, a machined block that comprises bores therethrough to define the divider flow path 40 and the converger flow path 50. It is further contemplated that the divider flow path 40 and the converger flow path 50 can be formed by conduits (e.g., pipes), etc.

The first and second melt pumps 30a,b can be coupled to the manifold 38. For example, the first and second melt pumps 30a,b can be positioned on opposing sides of the manifold 38. It is contemplated that the first and second melt pumps 30a,b can be attached directly to (e.g., biasing against) the opposing sides of the manifold 38 via fasteners such as screws, bolts, and the like. Accordingly, the inlet 32 and the outlet 34 of each melt pump 30 can optionally be positioned on the same side of the melt pump so that the melt pump can mate with the manifold 38 to align both the inlet and outlet of the melt pump with the respective split outlet of the divider flow path 40 and inlet of the converger flow path 50.

It is contemplated that by coupling the first and second melt pumps 30a,b to the manifold 38, advantageously, the first and second melt pumps can easily be decoupled for cleaning, servicing, repair, or replacement.

The first and second melt pumps 30a,b can have a maximum flow specification. For example, the melt pumps 30 can have specifications of cubic centimeters per revolution (cc/rev) with a maximum speed. Accordingly, the maximum flow specification of a melt pump can be a volumetric flow rate that is a product of the specification of cubic centimeters per revolution and the maximum speed of the pump. Optionally, the maximum flow specifications of the first and second melt pumps 30a,b can be different. For example, the maximum flow specification of the first melt pump 30a can be greater than the maximum flow specification of the second melt pump 30b. In further aspects, the maximum flow specification of the first melt pump 30a can be equal to, or substantially equal to, the maximum flow specification of the second melt pump. It is contemplated that the maximum flow specification can further be a mass flow rate, which can be attained by multiplying the volumetric flow rate by the melt density of the material.

Figure 5:
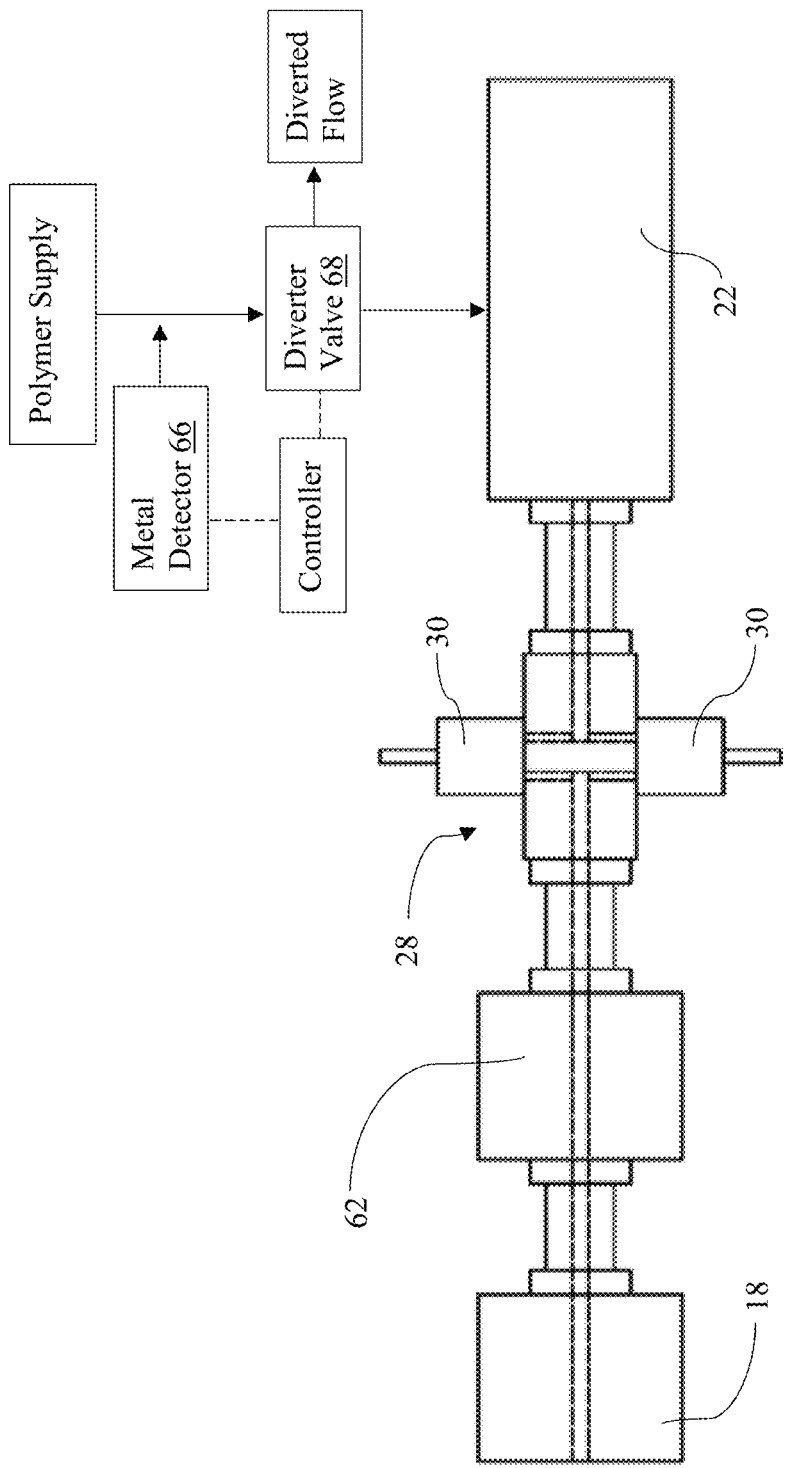
FIG. 5 is a schematic diagram of a system for forming polymer product as disclosed herein.

A first filter 60 can be fluidly positioned between the extruder 22 and the melt pump subsystem 28 so that flow from the extruder passes through the first filter before flowing into the melt pump subsystem. A second filter 62 can be fluidly positioned between the melt pump subsystem 28 and the transfer line 14 so that flow from the melt pump subsystem passes through the second filter before flowing into the transfer line. The first and second filters 60, 62 can optionally be received within respective automatic or manual screen changers. It is further contemplated that the first and/or second filter can optionally be omitted. For example, referring also to FIG. 5, in some aspects, the first filter 60 can be omitted. It is contemplated that omitting the filter can reduce the time and effort required for periodic removal of the filter for cleaning. In further aspects, a metal detector 66 (e.g., a magnetic detector or an Eddy current detector) can be included upstream of the pumps 30 (and, optionally, upstream of the extruder 22). The metal detector 66 can be in communication with a diverter valve (optionally, through a controller) so that detection of magnetic material (e.g., metal particulates/objects/debris) causes the diverter valve to actuate to divert flow, having detected magnetic material therein, from the extruder and pumps. In this way, metal particulates that could damage the pumps can be detected and redirected away from the pumps. The metal detector 66 can be particularly advantageous in embodiments without the first filter 60, enabling omission of the filter without risking damage to the pumps by metallic (or magnetic) particulates/debris. However, in other aspects, the system can comprise both a first filter 60 and a metal detector 66.

The injection system 20 can have a flow axis 64. Optionally, each of the first and second melt pumps can be radially spaced from the flow axis 64. In further embodiments (not illustrated), the flow axis 64 can extend through the first melt pump 30a or the second melt pump 30b.

For example, in some aspect, one or more of the melt pumps 30 can be inline gear pumps. In further aspects, one or more of the melt pumps 30 can be melt spinning pumps. In exemplary aspects, an inline gear pump can be part of a main product pipeline, whereas a melt spinning pump can be positioned parallel to the main product pipeline. According to some optional aspects, first melt pump 30a can be an inline gear pumps (e.g., sharing a flow axis with the flow axis 64 of the injection system). It is further contemplated that the first and second melt pumps 30a,b, can be melt spinning pumps and can advantageously be offset from the flow axis 64 and coupled to the manifold 38 as described herein.

Optionally, the injection system 20 can be configured so that an entirety of the flow from the outlet 26 of the extruder 22 collectively passes through the first pump and the second pump. In further aspects, the melt pump subsystem 28 can comprise three or more melt pumps 30.

Advantageously, the melt pumps 30 can be configured for easy removal and replacement. For example, the melt pumps 30 can be decoupled from the manifold 38. The respective exposed split outlet of the divider flow path 40 and inlet of the converger flow path 50 can be blocked. For example, a blocking plate can be coupled to the manifold where the pump 30 has been removed. In exemplary aspects, the blocking plate can comprise a flange that defines a hole pattern for receiving screws in the same locations as those used for coupling the pump 30 to the manifold 38. In some aspects, the blocking plate can comprise plugs that block and inhibit fluid flow through the split outlet of the divider flow path 40 and inlet of the converger flow path 50.

Operation of the Exemplary System

Polymer flow from the extruder can be divided between the first melt pump 30a and the second melt pump 30b. The polymer flow can then be pumped into the polymer transfer line.

Optionally, an equal or substantially equal volumetric flow rate can be pumped through the first melt pump and the second melt pump. This can be achieved, for example, by operating the first and second melt pumps 30a,b at the same speed, with the first and second melt pumps having the same flow specification (e.g., in cc/rev).

Optionally, a first volumetric flow rate can be pumped through the first melt pump and a second volumetric flow rate can be pumped through the second melt pump, wherein the first volumetric flow rate is different from the second volumetric flow rate. For example, optionally, the first and second melt pumps 30a,b can have different flow specifications (e.g., in cc/rev), and the first and second melt pumps can be operated at the same speed. In further aspects, the first and second melt pumps 30a,b can have the same flow specifications (e.g., in cc/rev), and the first and second melt pumps can be operated at different speeds. In yet further aspects, the first and second melt pumps 30a,b can have different flow specifications (e.g., in cc/rev), and the first and second melt pumps can be operated at different speeds. In yet further aspects, the one of the first or second melt pumps can be stopped while the other of the first or second melt pumps can pump. In various aspects, the flow through the first melt pump can be greater than 110% or greater than 120% or greater than 150% or greater than 200% or greater than 400%, or greater than 500%, or between 100% and 600%, or between 100% and 400% of the flow through the second melt pump.

In some aspects, operators can target a particular volumetric flow rate by controlling pump speed, whereas mass flow rate, being a function of density of the material, can require the operator to account for the density of the material. It is further contemplated that viscosity can affect volumetric efficiency of the pumps. For example, high viscosity can reduce volumetric efficiency of the pumps.

Optionally, one or both of the first and second melt pumps 30a,b can be operated to pump, with high accuracy, at low flow rates relative to a maximum capacity flow rate of the melt pump subsystem. The maximum flow specification of the melt pump subsystem can be defined as a sum of the maximum flow specifications of the melt pumps 30 (e.g., the sum of the maximum flow specifications of the first and second melt pumps 30a,b). For example, at least one of the first or second melt pumps 30a,b, or both of the first and second melt pumps, can be operated at less than 50%, or less than 30%, or less than 20% (e.g., between about 15% and about 25%, between about 15% and about 30%, or between 15 and 50% of the maximum flow specifications of the respective melt pump. It is contemplated that operating two smaller pumps at a particular combined flow rate can provide a more accurate combined flow rate than a single pump with the same maximum capacity flow rate of the two smaller pumps combined when operating at the same particular flow rate as the two smaller pumps. This is because the single pump has to operate at a lower relative speed to its maximum speed to provide for the lower flow rate, and flow rate accuracy decreases as pump speed decreases. Accordingly, each of the two pumps having a relatively lower maximum flow rates can operate at a higher relative speed of their maximum speed to produce a combined lower flow rate. Because the pumps can have higher accuracy at higher speeds, multiple smaller pumps operating at higher relative speeds can provide a more accurate flow rate, particularly at relatively low flow rates, than a single larger pump providing the same low flow rate.

Figure 6:
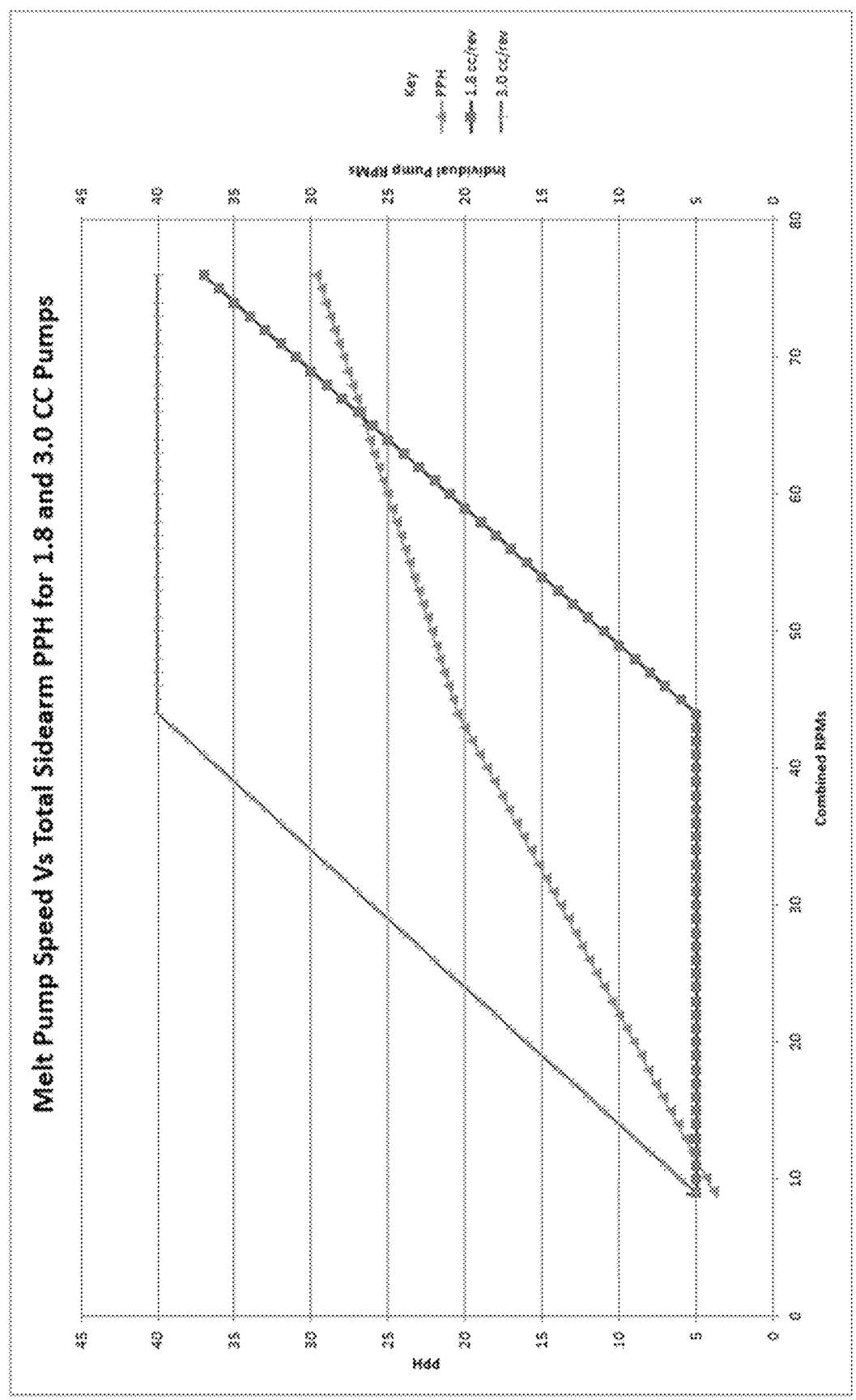
FIG. 6 is a plot showing operation speed of each of first and second pumps and a combined volumetric flow rate.

In exemplary aspects, the first melt pump 30a can have a larger maximum capacity flow rate (e.g., a higher displacement pump) than the second melt pump 30b (e.g., a lower displacement pump). In these aspects, optionally, the first melt pump can be operated at or near its maximum flow, and the second melt pump can operate to adjust (e.g., fine tune) the flow of the melt pump subsystem 28. In further optional aspects, and with reference to FIG. 6, the melt pump with the lesser maximum capacity flow rate can be operated at a fixed low speed (flow rate), and the speed of the melt pump with the greater maximum capacity flow rate can be varied to fine tune the flow of the melt pump subsystem 28. If the melt pump with the greater maximum capacity flow rate reaches its maximum capacity flow rate, the melt pump with the lesser maximum capacity flow rate can be sped up to increase flow so that the system can achieve the desired flow rate. The fixed low speed of can be determined as a minimum flow rate with acceptable accuracy. In other aspects, the first melt pump (with the larger maximum capacity flow rate) can be operated at a fixed low speed (flow rate), and the speed of the second melt pump can be varied to fine tune the flow of the melt pump subsystem 28. If the second melt pump reaches its maximum capacity flow rate, the first melt pump can be sped up to increase flow so that the system can achieve the desired flow rate. In some aspects, it is contemplated that the flow rate through the pumps can be modulated to a target outlet pressure.

It is contemplated that the melt pump subsystem 28 can have an accuracy of plus or minus (+/−) 5% of a set flow rate when the set flow rate is 20% of the maximum capacity flow rate. Optionally, the melt pump subsystem 28 can have an accuracy of plus or minus 4% of a set flow rate when the set flow rate is 40% of the maximum capacity flow rate. Optionally, the melt pump subsystem 28 can have an accuracy of plus or minus 3% of a set flow rate when the set flow rate is 60% of the maximum capacity flow rate. Optionally, the melt pump subsystem 28 can have an accuracy of plus or minus 2% of a set flow rate when the set flow rate is 80% of the maximum capacity flow rate. Optionally, the melt pump subsystem 28 can have an accuracy of plus or minus 1% of a set flow rate when the set flow rate is 100% of the maximum capacity flow rate.

In exemplary aspects, each melt pump 30 can have an accuracy tolerance of +1-1% when operated at 100% of the maximum capacity flow rate, +/−2% at 80% of the maximum capacity flow rate, +/−3% at 60% of the maximum capacity flow rate, +/−4% at 40% of the maximum capacity flow rate, +/−5% at 20% of the maximum capacity flow rate. Thus, such an exemplary pump operated at 80% of its maximum capacity flow rate and having a maximum capacity flow rate of 10 pounds per hour can be known to be flowing between 7.8 and 8.2 pounds per hour.

General System and Method of Using Pumps in Parallel

Although embodiments disclosed herein are directed to polymer flow and pumping polymer, it is contemplated that the systems and methods herein are applicable to pumping non-polymer materials. For example, food can be pumped using the disclosed pumping systems and methods. It is contemplated that food flow can more accurately be controlled and measured using embodiments disclosed herein than using conventional pumping systems.

For example, flow from a flow source can be divided between a first pump and a second pump, and the pumps can pump the flow in to a transfer line.

Each of the first and second pumps can have a maximum flow specification. Optionally, the maximum flow specification of the first pump can be greater than the maximum flow specification of the second pump. Optionally, the maximum flow specification of the first pump can be equal to the maximum flow specification of the second pump.

Optionally, an equal or substantially equal volumetric flow rate can be pumped through each pump. Optionally, a first volumetric flow rate can be pumped through the first pump and a second volumetric flow rate can be pumped through the second pump, and the first volumetric flow rate can be different from (e.g., greater than or less than) the second volumetric flow rate.

Optionally, one or both of the first and second pumps can be operated at less than 30% of the respective maximum flow specification of the pump.

The first and second pumps can cooperatively define a maximum capacity flow rate. Optionally, the first and second pumps can pump with an accuracy of plus or minus 5% when the flow is 20% of the maximum capacity flow rate.

Dividing flow from the flow source between the first pump and the second pump can optionally comprise flowing the flow through a manifold. Flow from the first and second pumps can optionally be combined and injected into the transfer line.

Optionally, flow from the flow source can be divided equally or unequally between the first pump and the second pump.

Exemplary Aspects

In view of the described products, systems, and methods and variations thereof, herein below are described certain more particularly described aspects of the invention. These particularly recited aspects should not however be interpreted to have any limiting effect on any different claims containing different or more general teachings described herein, or that the "particular" aspects are somehow limited in some way other than the inherent meanings of the language literally used therein.

Aspect 1: An injection system comprising:
an extruder having an outlet; and
a melt pump subsystem comprising at least a first melt pump and a second melt pump, wherein each melt pump of the first and second melt pumps has an inlet and an outlet, wherein the inlet of each of the first and second melt pumps is in fluid communication with the outlet of the extruder, wherein the first and second melt pumps are arranged in parallel so that flow from the outlet of the extruder divides between the first melt pump and the second melt pump, wherein the outlet of each of the first and second melt pumps is in fluid communication with a polymer transfer line.

Aspect 2: The injection system of aspect 1, wherein the melt pump subsystem comprises a divider flow path having an inlet, a first split outlet, and a second split outlet, wherein the divider flow path is configured to divide flow from the inlet of the divider flow path between the first split outlet and the second split outlet, wherein the first split outlet is in fluid communication with the inlet of the first melt pump, wherein the second split outlet is in fluid communication with the second melt pump.

Aspect 3: The injection system of aspect 1 or aspect 2, wherein the melt pump subsystem comprises a converger flow path having a first split inlet, a second split inlet, and an outlet, wherein the converger flow path that is configured to combine flow from the first and second split inlets and deliver combined flow from the first and second split inlets to the outlet of the converger flow path, wherein the outlet of the converger flow path is in fluid communication with the polymer transfer line.

Aspect 4: The injection system of aspect 3, wherein the melt pump subsystem comprises a manifold that defines the divider flow path and the converger flow path.

Aspect 5: The injection system of aspect 4, wherein each of the first and second melt pumps is coupled to the manifold.

Aspect 6: The injection system of any one of the preceding aspects, wherein each of the first and second melt pumps has a maximum flow specification, wherein the maximum flow specification of the first melt pump is greater than the maximum flow specification of the second melt pump.

Aspect 7: The injection system of any one of aspects 1-5, wherein each of the first and second melt pumps has a maximum flow specification, wherein the maximum flow specification of the first melt pump is equal to, or substantially equal to, the maximum flow specification of the second melt pump.

Aspect 8: The injection system of any one of the preceding aspects, further comprising a first filter fluidly positioned between the extruder and the melt pump subsystem so that flow from the extruder passes through the first filter before flowing into the melt pump subsystem.

Aspect 9: The injection system of any one of the preceding aspects, further comprising a second filter fluidly positioned between the melt pump subsystem and the transfer line so that flow from the melt pump subsystem passes through the second filter before flowing into the transfer line.

Aspect 10: The injection system of any one of the preceding aspects, wherein the system has a flow axis, wherein each of the first and second melt pumps is radially spaced from the flow axis.

Aspect 11: The injection system of any one of the preceding aspects, wherein the system is configured so that an entirety of the flow from the outlet of the extruder collectively passes through the first pump and the second pump.

Aspect 12: A method comprising:
dividing flow from a flow source between a first pump and a second pump; and
pumping, by the first and second pumps, the flow into a transfer line.

Aspect 13: The method of aspect 12, wherein each of the first and second pumps has a maximum flow specification, wherein the maximum flow specification of the first pump is greater than the maximum flow specification of the second pump.

Aspect 14: The method of aspect 12, wherein each of the first and second pumps has a maximum flow specification, wherein the maximum flow specification of the first pump is equal to, or substantially equal to, the maximum flow specification of the second pump.

Aspect 15: The method of any one of aspects 12-14, wherein pumping, by the first and second pumps, the flow into the transfer line comprises pumping an equal or substantially equal volumetric flow rate through the first pump and the second pump.

Aspect 16: The method of any one of aspects 12-14, wherein pumping, by the first and second pumps, the flow into the transfer line comprises pumping a first volumetric flow rate through the first pump and a second volumetric flow rate through the second pump, wherein the first volumetric flow rate is different from the second volumetric flow rate.

Aspect 17: The method of any one of aspects 12-16, wherein each of the first and second pumps has a maximum flow specification, wherein pumping, by the first and second pumps, the flow into the transfer line comprises operating at least one of the first pump or the second pump at less than 30% of the maximum flow specification of the at least one of the first or second pumps.

Aspect 18: The method of aspect 17, wherein operating at least one of the first pump or the second pump at less than 30% of the maximum flow specification of the at least one of the first or second pumps comprises operating both the first pump and the second pump at less than 30% of the maximum flow specification.

Aspect 19: The method of any one of aspect 12-18, wherein the first and second pumps cooperatively define a maximum capacity flow rate, wherein pumping, by the first and second pumps, the flow into the transfer line comprises pumping with an accuracy of plus or minus 5% when the flow is 20% of the maximum capacity flow rate.

Aspect 20: The method of any one of aspects 12-19, wherein dividing flow from the flow source between the first pump and the second pump comprises flowing the flow through a manifold.

Aspect 21: The method of any one of aspects 12-20, wherein pumping, by the first and second pumps, the flow into a transfer line comprises:
combining flow from the first and second pumps; and
injecting combined flow from the first and second pumps into the transfer line.

Aspect 22: The method of any one of aspects 12-21, wherein dividing flow from the flow source between the first pump and the second pump comprises equally dividing flow between the first pump and the second pump.

Aspect 23: The method of any one of aspects 12-21, wherein dividing flow from the flow source between the first pump and the second pump comprises unequally dividing flow between the first pump and the second pump.

Aspect 24: The method of any one of aspects 12-23, wherein the transfer line is a polymer transfer line.

Aspect 25: The method of any one of aspects 12-24, wherein the flow is a polymer flow.

Aspect 26: The method of any one of aspects 12-25, wherein the flow source is an extruder, wherein the first pump and the second pump are melt pumps.

Although several embodiments of the invention have been disclosed in the foregoing specification, it is understood by those skilled in the art that many modifications and other embodiments of the invention will come to mind to which the invention pertains, having the benefit of the teaching presented in the foregoing description and associated drawings. It is thus understood that the invention is not limited to the specific embodiments disclosed herein, and that many modifications and other embodiments are intended to be included within the scope of the appended claims. Moreover, although specific terms are employed herein, as well as in the claims which follow, they are used only in a generic and descriptive sense, and not for the purposes of limiting the described invention, nor the claims which follow.

What is claimed is:

1. An injection system comprising:
an extruder having an outlet; and
a melt pump subsystem comprising at least a first melt pump and a second melt pump, wherein each melt pump of the first and second melt pumps has an inlet and an outlet, wherein the inlet of each of the first and second melt pumps is in fluid communication with the outlet of the extruder, wherein the first and second melt pumps are arranged in parallel so that flow from the outlet of the extruder divides between the first melt pump and the second melt pump, wherein the outlet of each of the first and second melt pumps is in fluid communication with a polymer transfer line so that flow leaving the outlets of each of the first and second melt pumps is combined in the polymer transfer line, wherein the polymer transfer line is configured to communicate the combined flow of the first and second melt pumps to a product forming device.

2. The injection system of claim 1, wherein the melt pump subsystem comprises a divider flow path having an inlet, a first split outlet, and a second split outlet, wherein the divider flow path is configured to divide flow from the inlet of the divider flow path between the first split outlet and the second split outlet, wherein the first split outlet is in fluid communication with the inlet of the first melt pump, wherein the second split outlet is in fluid communication with the second melt pump.

3. The injection system of claim 2, wherein the melt pump subsystem comprises a converger flow path having a first split inlet, a second split inlet, and an outlet, wherein the converger flow path that is configured to combine flow from the first and second split inlets and deliver combined flow from the first and second split inlets to the outlet of the converger flow path, wherein the outlet of the converger flow path is in fluid communication with the polymer transfer line.

4. The injection system of claim 3, wherein the melt pump subsystem comprises a manifold that defines the divider flow path and the converger flow path.

5. The injection system of claim 4, wherein each of the first and second melt pumps is coupled to the manifold.

6. The injection system of claim 1, wherein each of the first and second melt pumps has a maximum flow specification, wherein the maximum flow specification of the first melt pump is greater than the maximum flow specification of the second melt pump.

7. The injection system of claim 1, wherein each of the first and second melt pumps has a maximum flow specification, wherein the maximum flow specification of the first melt pump is equal to, or substantially equal to, the maximum flow specification of the second melt pump.

8. The injection system of claim 1, further comprising a first filter fluidly positioned between the extruder and the melt pump subsystem so that flow from the extruder passes through the first filter before flowing into the melt pump subsystem.

9. The injection system of claim 1, further comprising a second filter fluidly positioned between the melt pump subsystem and the transfer line so that flow from the melt pump subsystem passes through the second filter before flowing into the transfer line.

10. The injection system of claim 1, wherein the system has a flow axis, wherein each of the first and second melt pumps is radially spaced from the flow axis.

11. The injection system of claim 1, wherein the system is configured so that an entirety of the flow from the outlet of the extruder collectively passes through the first pump and the second pump.

12. A method comprising:
dividing flow from a flow source between a first pump and a second pump;
pumping, by the first and second pumps, the flow into a transfer line so that flow from the first and second pump are combined within the transfer line.

13. The method of claim 12, wherein each of the first and second pumps has a maximum flow specification, wherein the maximum flow specification of the first pump is greater than the maximum flow specification of the second pump.

14. The method of claim 12, wherein each of the first and second pumps has a maximum flow specification, wherein the maximum flow specification of the first pump is equal to, or substantially equal to, the maximum flow specification of the second pump.

15. The method of claim 12, wherein pumping, by the first and second pumps, the flow into the transfer line comprises pumping a first volumetric flow rate through the first pump and a second volumetric flow rate through the second pump, wherein the first volumetric flow rate is different from the second volumetric flow rate.

16. The method of claim 12, wherein dividing flow from the flow source between the first pump and the second pump comprises flowing the flow through a manifold.

17. The method of claim 12, wherein pumping, by the first and second pumps, the flow into a transfer line comprises:
combining flow from the first and second pumps; and
injecting combined flow from the first and second pumps into the transfer line.

18. The method of claim 12, wherein the transfer line is a polymer transfer line, wherein the transfer line communicates the combined flow to a product forming device.

19. The method of claim 12, wherein the flow is a polymer flow.

20. The method of claim 12, wherein the flow source is an extruder, wherein the first pump and the second pump are melt pumps.

* * * * *